(No Model.)
H. E. WAITE.
BATTERY CELL.
No. 432,681. Patented July 22, 1890.
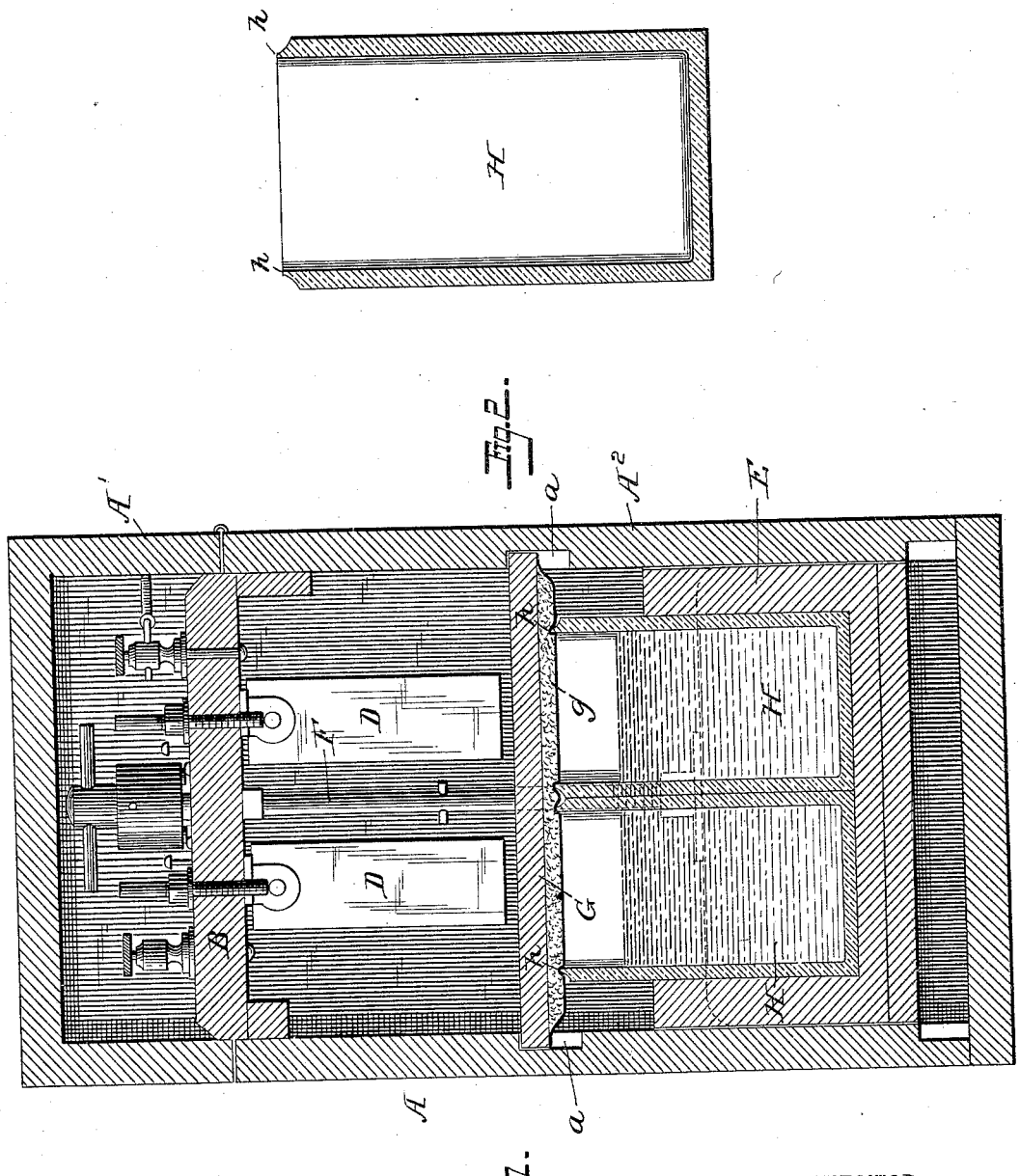
WITNESSES
Jno. G. Hinkel
H. S. McArthur
INVENTOR
Henry E. Waite
By Foster Freeman
Attorneys

UNITED STATES PATENT OFFICE.

HENRY E. WAITE, OF NEW YORK, N. Y., ASSIGNOR TO THE WAITE & BARTLETT MANUFACTURING COMPANY, OF SAME PLACE.

BATTERY-CELL.

SPECIFICATION forming part of Letters Patent No. 432,681, dated July 22, 1890.

Application filed May 6, 1890. Serial No. 350,741. (No model.)

*To all whom it may concern:*

Be it known that I, HENRY E. WAITE, a citizen of the United States, residing at New York, in the county and State of New York, have invented certain new and useful Improvements in Battery-Cells, of which the following is a specification.

My invention relates to galvanic batteries, and more especially to the construction of the cells of such batteries which are adapted to be portable, as when used in medical batteries which have to be transported from place to place; and the invention consists in a cell constructed and arranged substantially as hereinafter pointed out.

In the accompanying drawings, Figure 1 is a transverse section of a medical-battery case, showing one manner of using my improved cell; and Fig. 2 is a transverse section of the cell.

In the construction and use of battery-cells it is often desirable to transport them from place to place while filled or containing the requisite amount of liquid or electrolytic fluid without the necessity of emptying them. This is especially the case in using cells in electro-medical batteries, where it is common to arrange a number of cells in a case with the electrodes supported above the cells, and to provide means whereby the electrodes may be lowered into the cells or the cells moved upward to immerse the electrodes therein when it is desired to use the battery in producing currents, and when they are not in use the cells and electrodes are separated to prevent waste and the batteries so transported are sealed and held in readiness for instant use. It is common in such cases to provide what is known in the art as a "hydrostat," which shall cover the liquid-containing cells and prevent their spilling. My invention is shown applied to such a battery, and such, for instance, as is more fully described and illustrated in my prior patent, No. 374,329, dated December 6, 1887, and Fig. 1 of the present drawings illustrates so much of such a battery as is necessary to the clear understanding of my present invention. In said drawings, the case A is provided with a hinged top A' and a hinged side $A^2$, and supported upon a platform B are the electrical connections and switch devices, which may be of any desired arrangement, and suspended from said platform are the electrodes D. Mounted in the bottom of the box, and preferably in a removable drawer E, are a number of battery-cells, and this drawer with its cells is provided with handles F, one of which is shown, whereby the drawer and its contained cells may be lifted up so as to cause the electrodes to be immersed in the fluid in the cells when the battery is in use. When the battery is not in use, the cells and their containing-drawer or other support are lowered to the bottom of the box and a hydrostat G is placed over the cells. In the instance shown the rear of the case and the front hinged door $A^2$ are provided with recesses $a$, into which the edges of the hydrostat fit, and the lower face of the hydrostat is provided with a cushion or pad $g$, preferably covered with rubber or other similar material. The handles F are so arranged that the support for the cells may be drawn upward, so as to cause the upper edges of the cells to impinge and bear against the cushion or pad $g$ of the hydrostat to prevent overflow.

While this device has been found efficient to a greater or less extent, there is still danger of an overflow or spilling of the liquid, owing to the fact that the edges of the battery-cells have heretofore been made flat and comparatively broad and perhaps more or less uneven, so that the contact between the hydrostat and the edges of the cell was not perfect and the edges would not impress themselves into the pad sufficiently to form a tight joint. To overcome this objection, I form the upper udges $h$ of the cells H so that they will present a narrow surface or edge to bear against the hydrostat, and thereby embed themselves in the pad or cushion sufficiently to form a perfectly-tight joint. In accomplishing this the edges may be made in various ways, as by chamfering or beveling them, as shown in the drawings, or otherwise cutting them away to produce the sharp or narrow bearing-surfaces. This can readily be done in molding or otherwise forming the cell without additional expense, and I have found that it overcomes the difficulty heretofore experienced and furnishes a cheap and simple remedy therefor.

While I have thus described the use of my improved cell in connection with a specific form of battery, it is evident that I am not limited to such use, as the same results will be accomplished in other connections and arrangements.

What I claim is—

In a portable battery, the combination, with the hydrostat, of the battery-cells, the open ends of which are contracted to form narrow edges bearing against the hydrostat, substantially as described.

In testimony whereof I have signed my name to this specification in the presence of two subscribing witnesses.

HENRY E. WAITE.

Witnesses:
W. H. WOODHULL,
CHAS. SPARMAN.